United States Patent Office 3,375,204
Patented Mar. 26, 1968

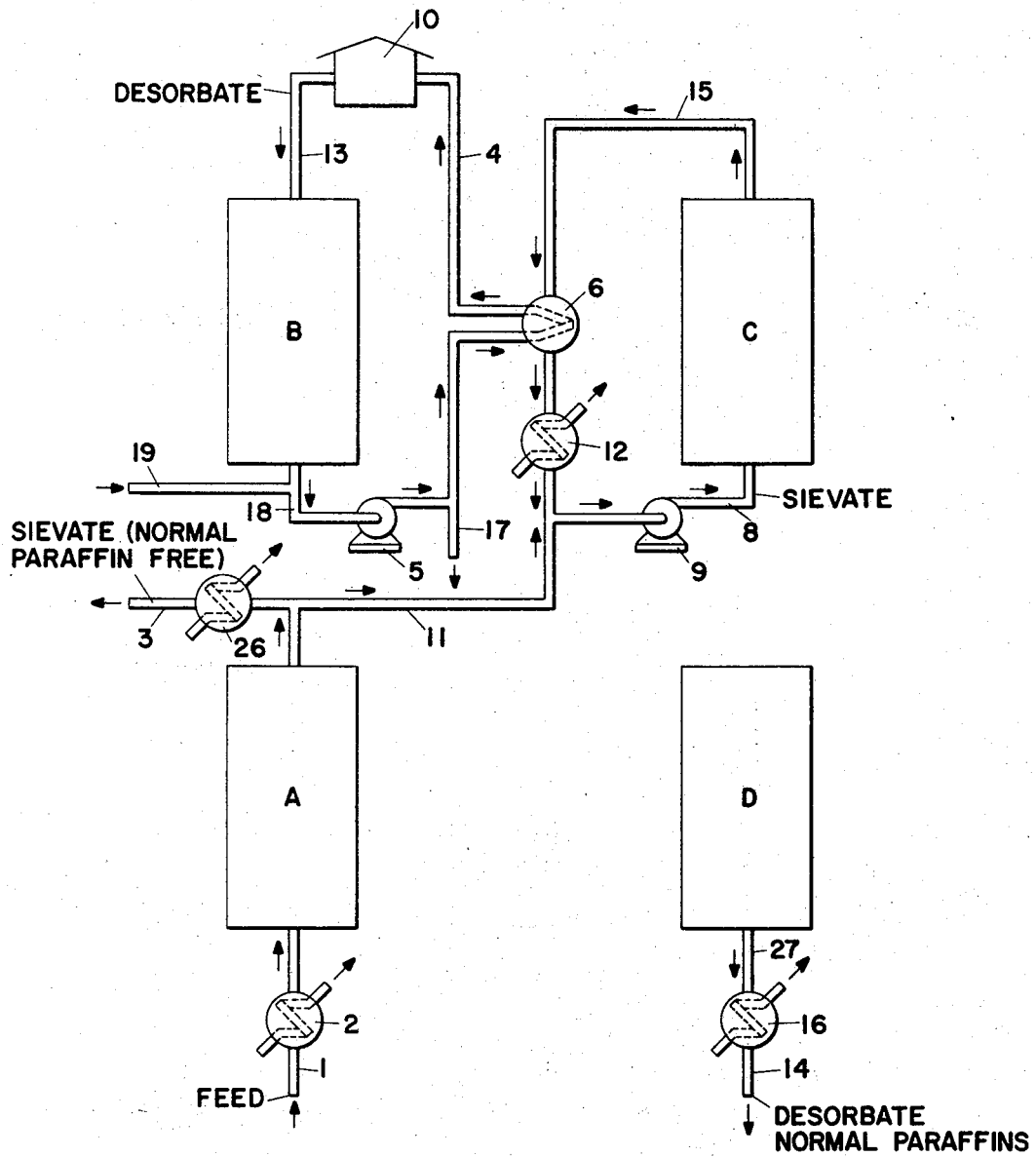

3,375,204
REGENERATION OF MOLECULAR SIEVE ADSORBENTS
Ronald C. Hoke, Berkeley Heights, N.J., assignor to Esso Research and Engineering Company, a corporation of Delaware
Continuation of application Ser. No. 757,367, Aug. 26, 1958. This application Feb. 12, 1963, Ser. No. 259,773
12 Claims. (Cl. 252—419)

ABSTRACT OF THE DISCLOSURE

Molecular sieve adsorbents are regenerated by burning carbonaceous deposits via a three-step process involving heating, treating with controlled oxygen stream and contacting with air, while controlling water concentration to below detrimental level.

---

This application is a continuation of copending application Ser. No. 757,367, filed Aug. 26, 1958 and now abandoned.

The present invention relates to an improved process for the efficient and economical separation and segregation of straight chain or aromatic hydrocarbons from mixtures comprising straight chain hydrocarbons, branched hydrocarbons, cyclic naphthenes and aromatics. The invention is particularly concerned with a method of improving the overall thermal efficiency of a molecular sieve separation process including both the adsorption stage and the desorption stage, and of periodically restoring the adsorptive capacity of the molecular sieve adsorbent.

It is well known in the art that various adsorbents, such as molecular sieves, will separate certain hydrocarbon components from a mixture due to a selected affinity for one or more components of the mixture as, for example, a mixture comprising straight chain hydrocarbons, branched hydrocarbons, cyclic naphthenes and aromatics. It has been known for some time that these zeolites, both naturally-occurring and synthetic, have the property of separating normal from isomeric branched chain hydrocarbons as well as from cyclic and aromatic admixtures. Other types of zeolites have the ability to segregate aromatic hydrocarbons from mixtures containing the same as, for example, a mixture comprising straight chain hydrocarbons, cyclic naphthenes, aromatics and branched type hydrocarbons. These zeolites have crystalline structures containing a large number of small cavities interconnected by a number of still smaller holes or pores, the latter being of exceptional uniform size. The pores may vary in diameter from 3 to 5 Angstrom units and up to 12 to 15 units or more. For a particular molecular sieve material, however, the pore sizes are substantially uniform and accordingly the material normally will be designated by the characteristic size of its pores.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6 \cdot H_2O$. Barrer (U.S. Patent No. 2,306,610) teaches that all or part of the sodium is replaceable by calcium to yield, on dehydration, a molecular sieve having the formula $(CaNa_2) Al_2Si_4O_{12} \cdot 2H_2O$. Black (U.S. Patent No. 2,522,426) describes a synthetic molecular sieve having the formula $4CaO \cdot Al_2O_3 \cdot 4SiO_2$.

The synthesis of molecular sieves having uniform pore sizes of 4 and 5 Angstrom units may be accomplished by mixing an aqueous solution of an alkali metal silicate having a ratio of alkali metal oxide/$SiO_2$ of about 0.8 to 1 or higher with a solution of sodium aluminate having a ratio of $Na_2O$ to $Al_2O_3$ of about 1/1–3/1 at a temperature of from about 160° to about 215° F. in such proportions as to give a ratio of $SiO_2$ to $Al_2O_3$ in the mixture of 0.5–3/1. The mixture is held at the stated temperatures for a period of time sufficient to form a crystalline sodium alumino-silicate, which is a molecular sieve material having a uniform pore size of about 4 Angstrom units. A pore size of about 5 Angstrom units may be produced in this material by base exchange reaction with an alkaline earth metal such as calcium, in the form of calcium chloride, for example. In either instance, the molecular sieve material produced is water washed and activated by calcining.

The synthesis of a molecular sieve material having a pore size of about 13 Angstom units may be produced by mixing an aqueous solution of an alkali metal silicate having a ratio of alkali metal oxide $SiO_2$ of about 1/1 or higher with a solution of sodium aluminate having a ratio of $Na_2O$ to $Al_2O_3$ of 1/1–3/1 at 160° to about 250° F. in proportions such as to give a ratio of $SiO_2$ to $Al_2O_3$ in the mixture of 3/1–10/1. This mixture is then held at the stated temperatures for at least an hour, and preferably longer, thereby producing the molecular sieve material desired. The recovered sieve material is water washed and activated by calcining.

A large number of other naturally-occurring zeolites have molecular sieve activity, i.e., the ability to adsorb selectively certain components or component portions of a gaseous mixture. In some cases this selectivity stems from the fact that only molecules small enough to enter the pores will be adsorbed. This is the case with respect to the selective adsorption of normal paraffins with a 5 A. molecular sieve wherein only the normal paraffins will enter the 5 A. cavity. Molecular size alone, however, is not the sole basis for selective adsorption. For example, the selective removal of aromatic hydrocarbons by means of 13 A. molecular sieves from a hydrocarbon mixture comprising paraffins, naphthenes and branched hydrocarbons is due to the much higher affinity that the aromatic hydrocarbons have for the molecular sieve surface than do other hydrocarbons.

The 4 A., 5 A. and 13 A. molecular sieve materials are selective for particular types of hydrocarbons. In this respect, the adsorptive characteristics of 4A. 5A. and 13A. molecular sieves are represented in the following table:

| Adsorbed on 4 A. and 5 A. | Adsorbed on 5 A, but not 4 A. | Not Adsorbed on 4 A. or 5 A. | Adsorbed on 13 A. |
|---|---|---|---|
| (1) Ethane | (1) Propane and higher n-paraffins | (1) Isoparaffins | (1) All hydrocarbons within gasoline boiling range. |
| (2) Ethylene | (2) Butene and higher n-olefins | (2) Aromatics | (2) Aromatics strongly adsorbed. |
| (3) Propylene | | (3) All cyclics with 4 or more atoms in ring. | (3) Diolefins strongly adsorbed. |

The present process will, therefore, separate n-paraffins from mixtures of n-paraffins and iso-paraffins and/or cyclic or aromatics by the use of 5 A. molecular sieve. It will also separate aromatics from mixtures of aromatics and n-paraffins and/or iso-paraffins or cyclic hydrocarbons by the use of 13 A. molecular sieve.

As pointed out, one of the particularly attractive methods for removing normal paraffinic hydrocarbons from a light naphtha is to contact the naphtha with a molecular sieve adsorbent having pore diameters of 5 A., for example. Such a sieve will adsorb straight chain, paraffin hydrocarbons but not branched chain or cyclic hydrocarbons. In a commercial process it is necessary to employ a cyclic operation, that is, one involving an adsorption step followed by a desorption step and then a second adsorption step, and so on. Although excellent and selective separation of normal parafins from a naphtha can be realized by such a procedure, one of the limiting factors is that the adsorptive capacity of the molecular sieve decreases after a number of adsorption and desorption cycles. The loss of sieve capacity is considered to involve two factors, one of them being a decrease in the saturation capacity of the sieve, and the other that the rate of adsorption decreases so that for the same feed rate the sieve is less fully saturated at the time that feed breakthrough occurs.

To some extent, the loss in capacity may be related to the method employed for desorbing the zeolite. Thus, they may be desorbed by purging with an inert gas at 600° to 700° F., under a vacuum at 600° to 700° F., by displacement of the adsorbed straight chain hydrocarbon by a gaseous olefin such as propylene at 250° to 300° F., by raising the temperature from an adsorption temperature of about 300° F. to a desorption temperature of about 700° F., or by a combination of vacuum and heat at about 700° F. In each type of desorption the sieve gradually loses capacity, though not at the same rate. This temporary loss in sieve capacity is due to the gradual accumulation of hydrocarbons or hydrocarbon derivatives, such as sulfur, nitrogen, or oxygen-containing compounds, which are not desorbable and recoverable as such. The nature of these accumulated deposits varies with the feed stock, the quantity of feed treated, operating conditions, etc. Thus, the deposits may be due to (1) polymerization or condensation of unsaturates or other reactive components on the surface of the cavities, (2) to retention, in the cavities, of small amounts of polar compounds present in the feed, and (3) to possible molecular rearrangements within the highly active cavity surfaces to produce branched chain or cyclic compounds which are now too large to get out of the sieve pores, or (4) to various combinations of these or other related conversions.

It is the principal object of the present invention to provide an improved regenerating procedure wherein the adsorptive capacity of molecular sieves may be periodically restored by removing non-desorbable hydrocarbons, thereby substantially prolonging the useful life of the molecular sieves. Other and further objects and advantages of the present invention and the scope encompassed by the invention will be apparent from the ensuing description and from the claims. Though the removal of carbonaceous material from spent catalysts by oxidative regeneration is well known, such a process per se is not applicable to regenerating the crystalline metallo-aluminosilicate zeolites used in the process of the present invention.

Because of the nature of the crystalline zeolitic adsorbents, unless the oxidative regeneration conditions are rigidly controlled, the presence of ordinary products of combustion, such as water, carbon dioxide and sulfur dioxide, can, at the temperatures involved in regeneration, seriously reduce the capacity of the zeolite. This reduction in capacity may not be apparent after one or two regenerations but is sufficiently large to reduce the life of the zeolite to such an extent as to make its commercial application impractical.

As one factor and element in this problem, the concentration of oxygen in the regenerating gas is critical, for a given amount of carbonaceous material on the zeolite determines the maximum temperature occurring during the regeneration. Thus, oxidation of 0.5% by weight carbon deposited on the zeolite with gas containing 1.5% by volume of oxygen increases the temperature of the zeolite from 500° to 1500° F. Exposure to this temperature for any appreciable length of time causes a series loss of capacity. On the other hand, for the same weight of carbon on the zeolite, the use of a gas containing 0.5% by volume of oxygen increases the temperature of the zeolite from 500° to only 750° F.

In accordance with the present invention, the adsorbent is restored without serious loss of capacity or life, by an oxidative regeneration technique involving critical conditions of temperature, and nature and concentration of the oxidizing gas. Due to the nature of the adsorbent, the conditions under which the oxidative regeneration is carried out must be maintained within specific limits in order to avoid permanent damage to the adsorbent structure.

In brief compass, the critical conditions include a temperature of between 500° to 1000° F., a regenerative gas oxygen content of less than about 2%, preferably less than 1%, a water content of the regenerative gas of less than 2%, and an $SO_2$ content of this gas of less than 0.7%. Only if these stringent conditions are met can the adsorbent be successfully regenerated without loss of capacity and shortening of life.

The process may be illustrated by describing the treatment of a light virgin naphtha having a boiling range of about 150° to 200° F. and a research octane rating of about 70 clear. A typical naphtha thus characterized may contain 20 to 25 percent of normal paraffin hydrocarbons, principally normal hexane, with a minor amount of normal heptane, the remaining material consisting principally of 6 and 7 carbon atom branched chain paraffins cyclic hydrocarbons. Essentially only normal paraffins will be adsorbed from such a naphtha on a molecular sieve of 5 A. size.

In accordance with one embodiment of the present invention in which a complete adsorption-desorption cycle involves four stages, the heat required for desorbing is recovered and effectively utilized. The complete cycle utilizes four reaction vessels operated in a coordinated and integrated manner. In essence, the reaction vessels designated as A, B, C and D are operated with respect to each other and with respect to the particular stage as follows:

| Stage | Vessel | | | |
|---|---|---|---|---|
| | A | B | D | C |
| 1 | Adsorb | Heat | Vacuum | Cool. |
| 2 | Heat | Vacuum | Cool | Adsorb. |
| 3 | Vacuum | Cool | Adsorb | Heat. |
| 4 | Cool | Adsorb | Heat | Vacuum. |
| 1 | Adsorb | Heat | Vacuum | Cool. |

The invention will be specifically described in conjunction with the drawing illustrating one adaptation of the same. The reaction vessels are designated as A, B, C and D. The operation removes normal paraffins by means of 5 A. sieves. In order to simplify the description, the necessary manifolding and valves required to change the respective vessels from stage to stage are not shown. This piping is well understood in the art.

Referring to zone A which is on adsorption, feed enters through line 1, is heated and vaporized in exchanger zone 2, and enters the bottom of zone A at a temperature of about 250° F. Normal paraffins are adsorbed by the sieve and a normal paraffin-free product, or sievate, leaves the top of zone A through line 3. This sievate is cooled and condensed in zone 26 and then goes to storage to be further processed as desired. The feed is stopped when the sieve has reached a predetermined degree of saturation so that essentially none of the normal hydrocarbons break through with the sievate into line 3.

While zone A is on the adsorption cycle, zone B is on heating or the desorption cycle. Heating is accomplished by circulating desorbate vapor downwardly through the sieve zone B, through compressor 5, exchanger 6, exchanger or furnace 10, and back to the top of the sieve zone. The desorbate vapor used enters through line 19 either from another sieve zone or from storage. Product desorbate is removed by means of line 17 and handled as desired. The recycled desorbate vapor is heated in exchanger 6 to a temperature in the range from about 350° to 550° F. as, for example, of about 450° F. and further heated in zone 10, which may be a heat exchanger or furnace, to a temperature in the range of 600° to 700° F. as, for example, of about 650° F. Thus, the sieve temperature at the inlet of zone B will start to rise to a higher temperature. As the heating cycle progresses, the sieve at the inlet of zone B will be about 650° F. and that at the outlet will be at a temperature somewhere between 250° and 650° F. A heat front of about 650° F., under the conditions specified, will move downwardly from the top of the sieve zone to the bottom or outlet. When the temperature of the gas leaving vessel B is about 400° to 500° F. as, for example, about 450° F., the heating stage is completed. Zone B may be operated during heating at approximately the same pressure as zone A. However, it is preferred that the pressure in zone B be in the range from 30 to 50 p.s.i.g. This will permit optimum sizing of the compressor.

At the end of the heating cycle, vessel B is swung to the vacuum stage illustrated by vessel D. Vacuum is imposed on vessel D by opening it through line 27 to condenser 16. Condenser 16 is operated at such a temperature as to give the desired vacuum in zone D. This may vary from 400 mm. mercury absolute to 50 mm. mercury absolute. The preferred vacuum will depend upon the condensing temperature available in condenser 16. From economic considerations, the preferred condensing temperature is about 30° to 60° F. With a $C_5$ to $C_6$ hydrocarbon feed this will give a vacuum in zone D of approximately 150 mm. mercury absolute. Product desorbate is removed from the condenser 16 by means of line 14.

While zone A is on adsorption, zone B is on heating and zone D on vacuum, zone C is on the cooling cycle. Cooling is accomplished by circulating sievate, that is, normal-free vapor by means of pump or compressor 9 through line 8 upwards through the sieve zone, then through exchanger 6 and exchanger 12. At the start of the cooling phase, a portion of the sievate from zone A is injected into this circuit by means of line 11 and compressor 9. This sievate, or raffinate, vapor is introduced into bottom of zone C at a temperature in the range of about 200° to 300° F., such as approximately 250° F., and contacts the sieve material which is at about 650° F. The stream leaves the top of zone C at approximately 650° F., is cooled in exchanger 6 to approximately 450° F., and in exchanger 12 to approximately 250° F., at which point it is recycled back to the bottom of the sieve zone C through compressor 9 and line 8. Under these conditions a cooling front will move upwardly through vessel C and at an intermediate point in the cooling stage the temperature at the bottom of vessel C will be about 250° F. and the temperature at the top of vessel C will be between 250° and 650° F. Cooling will be terminated when the outlet gas from the top of zone C reaches a temperature in the range of 400° to 500° F. such as approximately 450° F.

Heat is exchanged between the sieve on cooling in zone C and the sieve on heating in zone B by means of exchanger 6. Under the conditions of this invention, the heat requirements are minimized by the use of this exchanger. Only a small amount of incremental heat must be supplied through exchanger 10 and likewise only a minimum removed through exchanger 12.

Pressure in zone C may vary but the preferred pressure is between 30 and 50 p.s.i.g. in order to minimize compressor requirements.

It is also to be understood that further heat economy can be obtained in this process by using incoming feed as the coolant in exchangers 16 and 12.

Typical operating conditions for the treatment of a pentane-hexane fraction are as follows:

Adsorption:
    Pressure, p.s.i.g. _____ 15
    Time, min. _____ 10
    Feed, gm./100 gm. sieve _____ 13.3
    Temp., ° F. (end) _____ ~380
Heating:
    Pressure, p.s.i.g. _____ 30
    Time, min. _____ 30
    Inlet temp., ° F. _____ 650
    Amount, gm./100 gm. sieve _____ 50
    Temp., ° F. (end) _____ 590
Repressuring:
    Final pressure, p.s.i.g. _____ 30
    Time, min. _____ 3
    Amount, gm./100 gm. sieve _____ 1.0
    Temp., ° F. (end) _____ 565
Desorbate purge:
    Pressure, p.s.i.g. _____ 15
    Time, min. _____ 5
    Amount, gm./100 gm. sieve _____ 1.4
    Temp., ° F. (end) _____ 380
Vacuum:
    Final press., mm. Hg. abs. _____ —150
    Time, min. _____ 12
    Temp., ° F. (end) _____ 565
Cooling:
    Pressure, p.s.i.g. _____ 30
    Time, min. _____ 15
    Inlet temp., ° F. _____ 260
    Amount, gm./100 gm. sieve _____ 50
    Temp., ° F. (end) _____ 365

It is to be realized, as pointed out heretofore, that operating conditions may be varied, depending upon the character of the feed stock and other variables. While the cooling stage, as described, utilized sievate, it is to be understood that other cooling media such as hydrogen, methane, light hydrocarbon and the like, may also be used.

After a number of adsorption and desorption cycles when it is determined that the adsorptive capacity of the molecular sieves has been appreciably reduced, the molecular sieve in zone A is subjected to the regeneration step of the present invention. As previously stated, this step consists in removing all desorbable hydrocarbons, raising the temperature of the bed or a portion of the bed to a range of 500° to 1000° F., and passing therein an oxygen-containing gas through line 1. In general, temperatures above 1000° F. should be avoided because of danger of damage to the sieve. The temperature may be suitably raised by first passing through the bed a hot purge gas such as flue gas or nitrogen by means of line 1, the gas leaving the tower through line 3. When the desired temperature has been reached, the flow of purge gas is discontinued and the regenerating gas admitted. In all events, temperature is carefully controlled to avoid heating the sieve above about 1000° F. for any significant period of time.

An important feature of the present invention is the removal of all desorbable hydrocarbons preceding the introduction of oxygen. This critical step is necessary to minimize the generation of high temperature steam in the sieve which results from hydrocarbon oxidation. In this respect the oxidation of the non-desorbable residual hydrocarbons from the sieve differs from the usual type of catalyst reactivation, such as cracking catalyst, where the carbonaceous deposits are almost entirely coke, the percentage of hydrogen being very low.

At the end of the cycle preceding the oxidation treat, the sieve contains small amounts of normal paraffins. Hence, the particular means employed for removing desorbable hydrocarbons from the sieve preceding oxidation will usually depend on the type of cyclical operating procedure being employed. Therefore, various combinations of purging, evacuation, and low temperature steaming may satisfactorily be employed. Of the preferred methods are (1) steaming at temperatures below about 600° to 700° F., and (2) purging with an inert gas, such as nitrogen, methane, etc., during the time the sieve bed is being heated to the higher level preparatory to the oxidation step. As already indicated, these gases may be preheated and used to elevate the bed temperature.

The resistance of the 5 A. type sieve to degradation by high temperature is illustrated by the following data obtained at calcination temperatures of 850° to 1500° F. in a dry atmosphere.

| Calcination Conditions | | Absorption Capacity for n-heptane, cc./gram | |
|---|---|---|---|
| Temp., °F. | Time, hrs. | 500 mm. Pressure | 10 mm. Pressure |
| 850 | 0 | 0.23 | 0.16 |
| 850 | 16 | .23 | .16 |
| 950 | 168 | .23 | .16 |
| 1,000 | 16 | .23 | .16 |
| 1,200 | 1 | .21 | .16 |
| 1,300 | 1 | .21 | .15 |
| 1,300 | 5 | .21 | .15 |
| 1,350 | 1 | .22 | .16 |
| 1,400 | 1 | .21 | .14 |
| 1,400 | 4 | .18 | .13 |
| 1,500 | 4 | 0 | 0 |

The 5 A. sieve appears stable indefinitely at 950° F. in the absence of moisture and for a reasonable length of time at 1300° F. It is destroyed slowly at 1400° F. and quickly at 1500° F. Prolonged steaming at 950° F. and above causes losses in adsorptive capacity and adsorption rate, although the X-ray crystal pattern was not changed. Illustrative data are shown in the following tabulation for various 5 A. modifications.

STEAM STABILITY OF VARIOUS 5A. MODIFICATIONS
950° F., 1 ATMOSPHERE STEAM

| Meta. Form of Sieve | Time, hours | n-Heptane Adsorption | | X-ray Examination |
|---|---|---|---|---|
| | | Capacity, cc./g. | Relative rate | |
| Calcium | 0 | 0.19 | 1 | 5A. Pattern. |
| Do | 113 | .19 | 18 | No Change. |
| Zinc | 0 | .16 | 1 | 5A. Pattern. |
| Do | 162 | .13 | 3 | No Change. |
| Cadmium | 0 | .18 | 1 | 5A. Pattern. |
| Do | 103 | .14 | 5 | No Change. |

Steam deactivated 5 A. sieves can in some instances be restored to their original adsorption rates by low temperature steaming, such as that employed in the hydrocarbon desorption step described above. However, losses in adsorptive capacity are usually more permanent and are to be avoided.

Following the removal of desorbable hydrocarbons, an oxygen-containing gas is introduced into the sieve bed under conditions which cause the partial or more or less complete oxidation of the non-desorbable residual hydrocarbons or residues. Temperatures which must be held in the sieve bed to maintain combustion will vary between about 650° and 1200° F., preferably below about 1000° F. The oxygen content of the gas is less than 2%, preferably less than 1%.

The method for carrying out the oxidation in fixed-beds consists of burning in a wave-front procedure so that the temperature of the entire bed is not elevated. In this procedure the initial temperature of the sieve and oxygen-containing gas are such that a burning-front is established at the gas inlet to the sieve bed. Thus, the initial, inlet bed temperature should be about 600° to 900° F. The combustion products, inert gas, steam, and any desorbed, partially oxidized hydrocarbons, are driven ahead of the burning front into portions of the sieve bed at lower temperature levels where the steam does no harm. The burning front may be initiated by (1) preheating the oxygen-containing gas, (2) use of oxidation promoters in the gas, such as oxides of nitrogen, and (3) oxidation promoters on the sieve, such as Cu, Mn, Cr, Fe, etc., introduced either by impregnation or by ion exchange with the sieve, or by other suitable means. A further advantage to this procedure will result from the use of a dry oxygen-containing gas in that the clean sieve following the burning front will be simultaneously dried in the short time held at the elevated temperature.

An excellent method of carrying out the burning is to do it in three phases, in order to control sieve bed temperatures. The first phase consists of purging the sieve with inert gas at high temperature. In the second phase, oxygen is blended with the inert purge in low concentrations, and the third phase consists of passing preheated air over the sieve bed. The following conditions may be used in burning.

| Phase | 1st | Pref. | 2nd | Pref. | 3rd | Pref. |
|---|---|---|---|---|---|---|
| Temp. of Gas at Inlet, °F | 500-1,000 | 700 | 500-1,000 | 700 | 500-1,000 | 900 |
| Temp. of Sieve at Start, °F | 500-1,000 | 700 | 500-1,000 | 700 | 500-1,000 | 900 |
| $O_2$ Conc. in Inlet Gas, percent | | | 0.2-10 | 0.75 | 21 | 21 |
| $O_2$ Rate, v./v./hr | | | 10-100 | 50 | 100-300 | 200 |
| Inert Rate, v./v./hr | 300-900 | 400 | 300-900 | 600 | | |
| Time, hrs | 0.5-8 | 2 | 0.2-3 | 1 | 1.0-10 | 6 |

The most critical variable is the concentration of oxygen in the inlet gas during the second phase of regeneration. An $O_2$ concentration of 0.75% has been found to limit sieve bed temperature rise to about 250° F. (starting at 700° F. and peaking at 950° F.)

The following examples illustrate the benefits obtained by the present invention:

EXAMPLE 1

In a vapor phase cyclic operation of the type described above, n-heptane was adsorbed from an 80% toluene-20% n-heptane mixture by an alumino-silicate of the 5A. type at 240° F. and then desorbed with propylene at the same temperature. With the fresh sieve the propylene desorbed 87% of the adsorbed n-heptane. After 14 cycles, the capacity of the zeolites had decreased to about 75%. The latter was then heated in an air stream for 2 hours at 850° F. Complete reactivation was effected.

A 5 Angstrom crystalline calcium-sodium alumino-silicate discharged from a pilot plant in which normal paraffins were removed from straight run naphtha was regenerated by burning in an air stream, and the capacity for n-hexane determined. The burning step employed an air rate of 0.05 cubic feet per minute, equivalent to 0.3 gram oxygen. For comparison, results obtained by regenerating (1) with vacuum and (2) with steam at 250° F. are included. High temperature steam cannot be employed as it destroys the sieve structure.

|  | Adsorptive Capacity, g./100 g. | Weight Percent Carbon | Surface Area, m.²/g. | Pore Vol., cc./g. |
|---|---|---|---|---|
| Fresh Sieve | 10.1 | 0.00 | 497 | 0.25 |
| Used, desorbed at 700° F., 4 mm | 8.1 | 2.3 | 408 | 0.19 |
| Used, desorbed at 850° F., 1 mm | 8.6 | 2.0 | | |
| Used, desorbed at 1,000° F., 1 mm | 8.6 | 1.3 | 434 | 0.22 |
| Used, burned at 850° F., in air | 10.0 | 0.2 | 471 | 0.22 |
| Used, burned at 1,000° F., in air | 10.2 | 0.1 | 467 | 0.23 |
| Used, steamed at 250° F | 7.3 | 1.3 | | |

These data show clearly the superiority of the regeneration technique of the present invention. Burning the carbon off in an air stream regenerated the sieve completely, while vacuum at high temperatures did not give the same extent of improvement, and steaming actually decreased the absorptive capacity.

EXAMPLE 2

As pointed out above, it is essential to employ a regeneration gas which is substantially dry. Flue gases and other regeneration gases low in oxygen, containing more than 2% amount of water, either are not suitable or must be dried prior to use in accordance with the present invention. Particularly since the recycling of flue gas is desirable, and since water is formed as a result of the combustion of carbonaceous deposits, means of removing water from the recycle flue gas is important. Tests were carried out in bench scale units using 25 grams of sieves. Synthetic flue gases containing various amounts of nitrogen, carbon dioxide and water were employed. The sieve was exposed to these gases at 900° F. and 1000° F. for at least 100 hours per test. The capacity of the zeolite was measured before and after exposure by first desorbing at 850° F. and 0.2 mm. Hg. abs. and then adsorbing n-hexane at 250° F. and 150 mm. Hg. abs. The results are shown in the table below:

| Gas Composition (Vol. Percent) | Temp. (° F.) | Cumulative Capacity Loss (g./100 g.) at Indicated Time Intervals (Time in Hours) | | | |
|---|---|---|---|---|---|
| | | 50 | 100 | 150 | 200 |
| Nitrogen Plus— | | | | | |
| 15% $CO_2$ | 900 | 0.1 | 0.2 | 0.3 | |
| 12% $CO_2$, 2% $H_2O$ | 900 | 0.1 | 0.3 | | |
| 12% $CO_2$, 2% $H_2O$ | 1,000 | 0.3 | 0.5 | 0.9 | 1.2 |
| 17% $CO_2$, 7% $H_2O$ | 900 | 2.1 | 2.9 | 3.4 | |

These data, depicting cumulative capacity loss as a function of the time for the various test conditions, show that deactivation and capacity loss become serious when the water content was increased from 2% to 7%.

EXAMPLE 3

A further important ingredient of the present invention is the use of regeneration or flue gas substantially free of sulfur dioxide. The regeneration gas employed in accordance with the present invention either must initially be free of $SO_2$ or it must be freed of this impurity. As little as 0.7% of $SO_2$ in the flue gas has been found to cause serious deactivation of the adsorbent. A good method for removing $SO_2$ from flue gas which may contain, on recycle, up to 2% of water resulting from combustion of carbonaceous deposits, is to contact the flue gas with silica gel. It is particularly unexpected that this reagent is effective for $SO_2$ removal inasmuch as the small amount of water present might be expected to be preferably adsorbed. It has been found that the capacity of the gel for $SO_2$ from the wet flue gas is substantially equal to the capacity of the gel for $SO_2$ from a dry gas. These results are shown in the two tables below:

$SO_2$ IN FLUE GAS DAMAGES MOLECULAR SIEVE.—[Temperature, 1,000° F.]

| Gas Composition (Vol. Percent) | Cumulative Capacity Loss (g./100 g.) at Indicated Time Intervals (Time in Hours) | | | |
|---|---|---|---|---|
| | 50 | 100 | 150 | 200 |
| Nitrogen Plus— | | | | |
| 12% $CO_2$, 2% $H_2O$ | 0.3 | 0.5 | 0.9 | 1.2 |
| 12% $CO_2$, 2% $H_2O$, 0.7% $SO_2$ | 2.2 | 3.0 | | |

$SO_2$ CAN BE REMOVED FROM WET FLUE GAS BY SILICA GEL

| Inlet Gas to Silica Gel Bed | Outlet Gas From Silica Gel Bed | Measured Capacity of Silica Gel for $SO_2$ (To $SO_2$ Breakthrough) | Published* Capacity of Silica Gel for Dry $SO_2$ (Saturation Capacity) |
|---|---|---|---|
| 0.7% $SO_2$ | 0.006% $SO_2$ | 0.6 gm./100 gm | 0.5 gm./100 gm. |
| 2% $H_2O$ | $H_2O$ not measured | | |

*Perry, J. H.: "Chemical Engineers' Handbook," 3rd edition, Fig. 52, p. 912, McGraw-Hill Book Co., Inc., New York 1950.

These data show that $SO_2$ is definitely detrimental to sieve capacity. Nearly 30% of the sieve capacity was lost after 100 hours. Furthermore, the silica gel treating step is highly useful in solving this problem.

As has been pointed out, the oxygen concentration used in regeneration is controlled by two factors, namely (a) the resulting temperature, and (b) the resulting concentration of damaging products of combustion, namely water and $SO_2$. Because of the stoichiometry of combustion of the carbonaceous deposit from the molecular sieve adsorbent used in hydrocarbon separations, the oxygen concentration must be less than 3% to hold the water concentration to 2% or less, in accordance with the equation:

$$2CH_2 + 3O_2 \rightarrow 2CO_2 + 2H_2O$$

This effect depends on the oxygen concentration and is independent of the amount of deposit.

Because of the complicated relation between the concentration of oxygen and deposit weight percent in determining the final combustion temperature in an adiabatic reactor, the use of dilute air may result in a greater increase in temperature than the use of undiluted air. For example, burning 0.5 wt. percent deposit with air results in a temperature rise of about 250° F. This can be tolerated since the final temperature would be about 700°+250°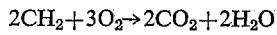=950° F. Burning with air at deposit concentrations below 0.5%, therefore, does not result in excessive temperatures. Above 0.5% deposit, however, dilute air must be used to keep the temperature within bounds. The oxygen concentration must be less than about 1%, preferably less than 0.7%. The above figures are based on theoretical calculations for an adiabatic regeneration.

Thus, it is highly undesirable to employ an oxygen content greater than 3% because of the resulting water formation and this, regardless of the amount of carbon on the sieve. Secondly, if more than 0.5 wt. percent of the deposit is on the sieve, the amount of oxygen must be limited to 0.7% to keep the temperature at an operable limit. Accordingly, 3% oxygen may be employed if the deposit is less than 0.5 wt. percent and 0.7 wt. percent is employed if the deposit is greater than 0.5 wt. percent. Were only carbon deposited on the adsorbent, undiluted air might be used provided the carbon was present to the extent of less than 0.5 wt. percent. However, in accordance with applicant's process, the deposit is hydrocarbonaceous and contains substantial amounts of hydrogen. The following tabulation delineates the effect of oxygen concentration and wt. percent of carbon deposit during regeneration:

EFFECT ON MOLECULAR SIEVE OF OXYGEN CONCENTRATION AND WEIGHT PERCENT CARBON DEPOSIT DURING REGENERATION

Initial bed temperature, 700° F.
Maximum tolerable temperature, 1,000° F.
Maximum tolerable $H_2O$, 2%.
Carbonaceous deposit has atomic ratio of hydrogen to carbon of 2/1 ($CH_2$)

| Wt. Percent Deposit | 0.1 | | | 0.5 | | | 1.0 | | |
|---|---|---|---|---|---|---|---|---|---|
| Vol. Percent $O_2$ in Inlet Gas | 0.5 | 3 | 21 | 0.5 | 3 | 21 | 0.5 | 3 | 21 |
| Temp. of Bed, °F | 790 | 758 | 753 | 940 | 1,200 | 970 | 870 | 2,700 | 1,300 |
| Percent $H_2O$ in Product Gas | 0.3 | 2 | 14 | 0.3 | 2 | 14 | 0.3 | 2 | 14 |

The process of the present invention may be modified in many details without departing from its spirit. Thus, it has also been found that, in addition to the relatively slow loss in capacity described above, there is also experienced a much more rapid loss in cycle capacity associated primarily with the use of propylene as desorbent. These losses, however, though caused by the presence of deposits on the sieves, may be satisfactorily removed by vacuum regeneration at about 700° F. This type regeneration may be carried out at about every 200 cycles depending on the conditions used. The oxidative regeneration technique is satisfactorily carried out in conjunction with the vacuum regeneration. That is, those impurities that accumulate either on or in the sieves that cannot satisfactorily be removed by vacuum are then removed by periodic oxidative regeneration.

Furthermore, not only may the spent 5 Angstrom zeolites be regenerated in this manner, but the same or similar technique may also be applied to zeolites having smaller or larger uniform pores, from 3 Angstroms to 15 Angstroms. The 10 and 13 Angstrom zeolites have the capacity of separating isomeric branched and cyclic hydrocarbons, have catalytic properties, and also tend to become deactivated.

In a still further embodiment of the invention, the spent sieve may be removed from the adsorber and conveyed by a moving screen or the like over a burner zone.

Advantage may also be taken of the catalytic cracking characteristics of the sieve to regenerate it. This is particularly useful when not too much carbon as such is deposited on the zeolite. Under these conditions, a temperature of about 550° to 900° F. is imposed upon the bed of used sieves at a pressure of one atmosphere and less. A small amount of oxygen or other promoter is then added as a cracking promoter, and a small amount of steam to suppress carbon formation. Thereafter, residual carbon may be removed in the manner previously described.

I claim:
1. A process for regenerating a bed of crystalline zeolitic molecular sieve by combustion of non-desorbable carbonaceous deposits accumulated thereon which comprises the steps of:
   (1) raising the temperature of said bed to within the range of about 500° to 1000° F.;
   (2) contacting said bed with high temperature regenerating gas containing less than about 1% oxygen to substantially combust said carbonaceous deposits; and
   (3) thereafter increasing the oxygen content of said regenerating gas up to 21% oxygen to combust residual carbonaceous deposits;
wherein the oxygen content of said regenerating gas is controlled to maintain a combustion temperature below the degradation temperature of said molecular sieve and to hold the water concentration to below about 2%.

2. The process according to claim 1, wherein the $SO_2$ content of said regenerating gas is held below about 0.7%.

3. The process according to claim 1, wherein the weight percent of said carbonaceous deposits, based on the weight of said molecular sieve, is above about 0.5 in Step 2 and below about 0.5 in Step 3.

4. The process according to claim 1, wherein the oxygen content in Step 2 is maintained at about 0.7%.

5. The process according to claim 1, wherein Step 1 is accomplished by purging said bed with inert gas at high temperature.

6. A process for periodically restoring the adsorptive capacity of a crystalline zeolitic molecular sieve having non-desorbable carbonaceous deposits accumulated thereon by a three-stage regenerative treatment which comprises (1) purging with an inert gas at a temperature within the range of about 500° to 1000° F.; (2) contacting with a high temperature oxygen-containing gas within said temperature range, said gas containing less than about 2% oxygen, less than about 2% $H_2O$ and less than about 0.7% $SO_2$; and (3) contacting with high temperature air within said temperature range; to thereby combust said carbonaceous deposits.

7. In a process wherein hydrocarbons are separated by adsorption from their mixtures by contacting such mixtures with crystalline zeolitic molecular sieves at a temperature in the range of from about 200° to 500° F. and adsorbed constituents selectively desorbed by applying heat thereto in a subsequent desorption step, and wherein non-desorbable carbonaceous deposits gradually accumulate on said zeolites, the improvement which comprises treating a flue gas so as to form an oxygen-containing regenerating gas containing less than 2% $O_2$, less than 2% $H_2O$ and less than 0.7% $SO_2$, and periodically restoring the adsorptive capacity of said adsorbent after a selected number of adsorption-desorption cycles and at least 0.5% by weight of said carbonaceous deposits accumulate on said adsorbent by subjecting the adsorbent to a temperature of from 500° to 1000° F. in the presence of said thus formed oxygen-containing regenerating gas.

8. The process of claim 7 wherein said adsorbent is substantially completely freed of desorbable hydrocarbons prior to said regeneration step.

9. The process of claim 7 wherein said regenerating gas contains about 0.7% oxygen.

10. The process of claim 7 wherein said sieve adsorbent is subjected to a three-stage regenerative treatment wherein in the first stage it is purged with an inert gas at elevated temperature, in a second stage with a gas containing less than 2% oxygen, and in a third stage with air.

11. The process of claim 7 wherein said treatment of flue gas is accomplished by contacting said flue gas with silica gel.

12. A process for removing non-desorbable carbonaceous deposits from a bed of crystalline zeolitic molecular sieve, said bed having a gas inlet and a gas outlet, which process comprises:
   (1) raising the temperature of at least the inlet portion of said molecular sieve bed to within the range of about 500° to 1000° F.;
   (2) thereafter flowing a stream of high temperature regenerating gas containing less than about 1% oxygen through said molecular sieve bed from said gas inlet to said gas outlet to substantially combust said carbonaceous deposits; and
   (3) thereafter increasing the oxygen content of said regenerating gas stream to a higher oxygen concentration to combust the residual carbonaceous deposits;
wherein the oxygen content of said regenerating gas stream is controlled to maintain a combustion temperature below the degradation temperature of said molecular sieve and to hold the water concentration of said regenerating gas stream at said gas outlet to below about 2%.

References Cited

UNITED STATES PATENTS

| 3,030,431 | 4/1962 | Mattox et al. | 260—676 |
| 3,069,362 | 12/1962 | Mays et al. | 252—419 |

FOREIGN PATENTS 777,232  6/1957  Great Britain.

DANIEL E. WYMAN, *Primary Examiner.*

C. F. DEES, L. G. XIARHOS, *Assistant Examiners.*